Nov. 8, 1938.　　　　　J. GERIN　　　　2,136,128
AIRPLANE HAVING A VARIABLE LIFTING SURFACE
Filed Nov. 13, 1935
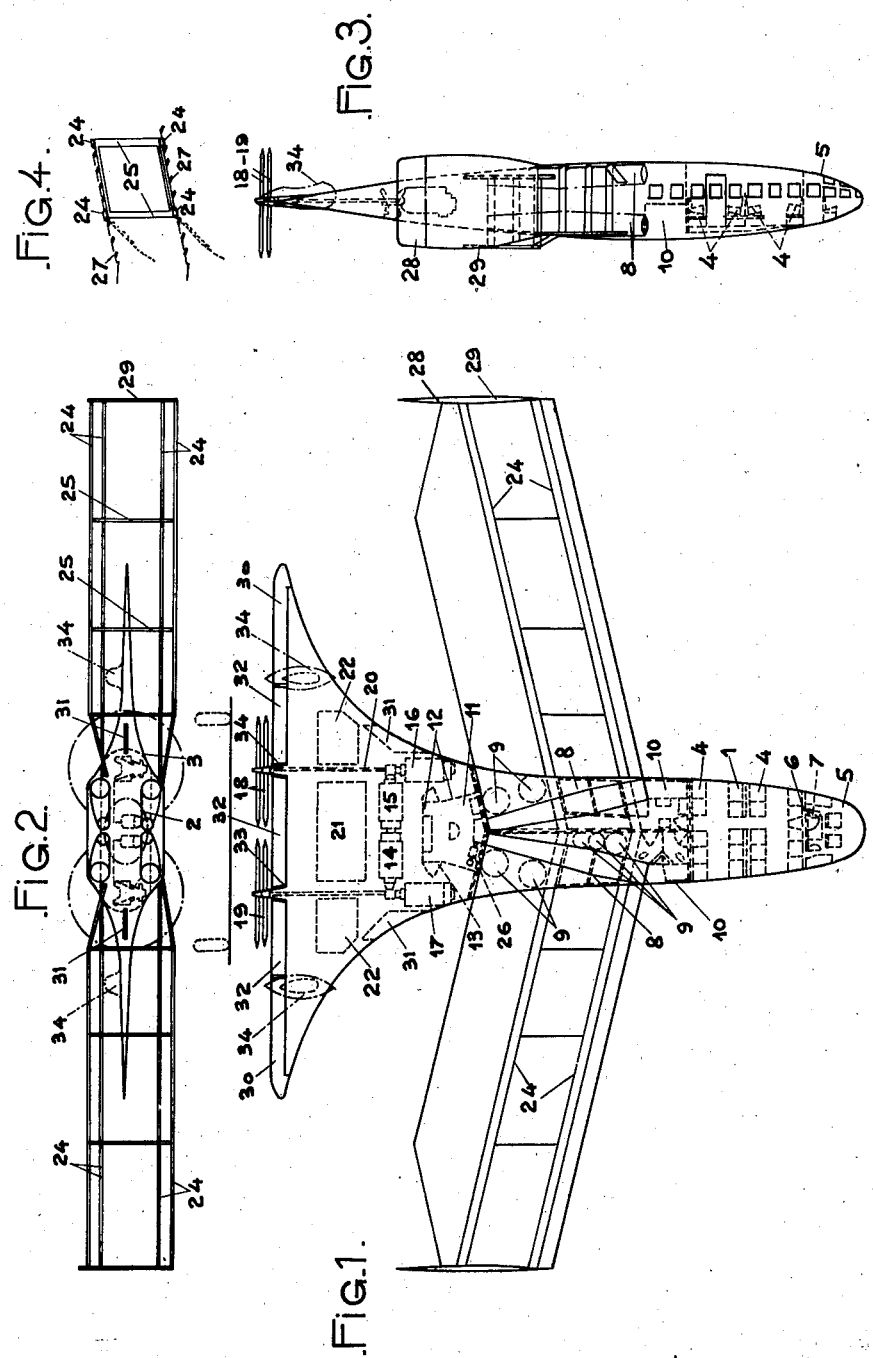

Patented Nov. 8, 1938

2,136,128

UNITED STATES PATENT OFFICE

2,136,128

AIRPLANE HAVING A VARIABLE LIFTING SURFACE

Jacques Gerin, Boulogne-sur-Seine, France

Application November 13, 1935, Serial No. 49,613
In France November 17, 1934

1 Claim. (Cl. 244—13)

This invention relates to an airplane having a lifting surface variable during flight, which utilizes in particular the means described in the United States Patents Nos. 1,787,517, 1,858,924, 1,979,194, and in the United States patent application filed on February 15, 1935, under No. 6,737, for "Improvements in airplanes having a variable lifting surface" in the name of the applicant.

The general technics of these means consists in providing lifting surfaces or fixed rigid planes adapted to ensure the lifting of the airplane at high speeds and along which flexible surfaces wound on operating drums can be spread out. These surfaces allow to substitute for the fixed lifting surface, a surface the automatically variable curvature of which allows the airplane to be maintained lifted when flying at low speed.

The airplane according to the invention comprises a single fuselage and is mainly characterized by the fact that the transverse ribs or transverse sections of this fuselage have a horizontal axis the length of which constantly increases from the front end to the outer or trailing edge of the empennage, whilst the vertical axes of the same transverse ribs vary for giving an aerodynamic profile (which is a non-lifting profile for the line of flight adopted at high speed) symmetrical relatively to the longitudinal axis, the airscrews being arranged at the trailing edge of the empennage or rear portion of the fuselage.

The invention is further characterized by the fact that:

The intermediate portion of the fuselage contains the drums for actuating the movable flexible surfaces and their driving and control mechanisms, as well as the fuel and oil tanks, the available space at the rear of the fuselage being used as engine room and as a cabin for the mechanics, and the available space at the front being reserved for the passengers and for the cockpit for the pilot, navigator and radiotelegraphist.

The fixed cellules comprise four fixed narrow lifting planes adapted to ensure the lifting of the airplane at high speeds, and arranged per pair for constituting a biplane when the movable flexible surfaces are spread out.

The controls for changing the line of flight in the horizontal plane are constituted by vertical rudders pivoted at the rear of tail-fins provided at the ends of the fixed cellules.

The stabilization and warping are ensured by the same ailerons or wing flaps pivoted at the trailing edge and at the ends of the widest rear portion of the fuselage, flaps for correcting the incidence being also provided on said trailing edge.

Other features of the invention will appear from the following description which relates to a construction of an airplane illustrated, by way of example only, in the accompanying drawing, in which:

Fig. 1 is a general plan view of the airplane.
Fig. 2 is a corresponding front view.
Fig. 3 is a general side view.
Fig. 4 is a diagrammatic side view of a cellule.

The single fuselage of the air plane is a hollow body I comprising two planes of symmetry containing its longitudinal axis: a vertical plane and a horizontal plane. In a section made through the horizontal plane, the profile of the fuselage is of constantly increasing width, as clearly shown in Fig. 1. The rear end or tail has a very great width relatively to the total length of the fuselage. This width can reach 85 to 90% of the length as in the constructional example illustrated.

In a section made through the vertical plane, the profile of the fuselage has an aerodynamic shape, the maximum cross section being situated slightly forward of the mid-length of the fuselage.

The cross sections of the fuselage, from the front end, are ellipses or closed curves approximating the latter and which are gradually flattened so as to convert themselves into closed figures presenting two horizontal parallel sides united by arcs of circles. Two of these sections are shown at 2 and 3 (Fig. 2).

According to an important feature of the invention, practically the entire available space within the fuselage is utilized. The front portion is reserved for the passengers whose seats are shown at 4. At the front end is reserved the cockpit 5 for the pilots, the navigator and the radiotelegraphist; this cockpit is separated from the passengers' saloon by a wall with entrance doors at 7 (Fig. 1).

The intermediate region of the fuselage contains in particular:

The winding drums 8 for the flexible surfaces and all their driving and control mechanisms.

The fuel and oil tanks 9.

In front of the space for the drums 8 and tanks 9 are provided lavatories for the passengers and two chambers or enclosures 10 for undercarriages retractable during flight. The free space in the tail, at the rear of the chamber for the drums 8, constitutes an engine room, with a cabin 11 for one or more mechanics. The walls 12 of this cabin are so made as to deaden the noise of the engines and to allow the mechanics to support long journeys, in admissible physiological conditions. In this cabin is provided a board on which are arranged all the indicating apparatus necessary for the control and supervision of the engines and their accessories. The mechanics are connected by telephone with the pilots' cockpit. Two doors 13 allow to have access to the engines.

In the example illustrated, four engines are provided: two, 16 and 17, longitudinally arranged, and two, 14 and 15, transversely arranged and coupled for driving two pairs of airscrews 18 and 19, the airscrews of one and the same pair rotating in reverse direction and being driven by lines of co-axial tubular shafts 20 in the manner known per se.

In the zone of smallest height comprised between the shafts 20 is provided a room 21 for luggage or cargo. Access may be had to this room 21 through doors or movable panels provided in the covering. At 22 are provided chambers or enclosures for undercarriages 23 retractable during flight.

As will be noted, this arrangement of the fuselage has, among others, the following advantages:

Practically, all the free space is utilized.

The passengers and pilots are far from the engines and, consequently, are not troubled by excessive noise.

The fuselage does not present any external projection capable of reducing penetration into air. For cooling the engines, use is made of radiators 31 merging with the covering.

The visibility for the pilots and even for the passengers is not limited in any way by the cellules.

As indicated above, the cellules each comprise four narrow lifting planes 24 grouped in pairs and constituting the stressed elements of a beam having transverse bracing ribs constituted by rigid frames with streamlined struts 25. The fixed lifting elements or planes 24 are connected through the fuselage so as to constitute a single beam.

The flexible surfaces are spread out along the fixed planes 24 under the action of an engine 26 arranged in the mechanics' cabin and the control of which is effected from a board within reach of the pilot. The flexible surfaces 27 having variable curvatures (Fig. 4) are utilized upon flying off and upon landing. During flight, the machine is lifted only by the narrow planes 24. In the example illustrated, the reduced lifting surface represents about one twelfth of the lifting surface when the flexible planes are spread out and that the line of flight becomes such that the fuselage acts as a lifting element. An equivalent proportion is obtained between the speed upon landing and the speed during flight, with reduced surface.

The controls of the airplane comprise:

Two vertical rudders 28 at the ends of the cellules. These rudders are pivoted on tail-fins 29 secured to the ends of the cellules. High sensitiveness is thus obtained considering the distance of the rudders from the center of gravity of the airplane.

Two stabilizing or warping ailerons or wing flaps 30 are pivoted at both ends of the trailing edge of the fixed empennage constituted by the tail or rear portion of the fuselage. A control system of any suitable arrangement allows:

Of actuating both ailerons or wing flaps simultaneously in the same direction for causing them to act as stabilizers or as elevators.

Of actuating them simultaneously, in reverse direction, for allowing them to act as warping ailerons. They act in this case with a high sensitivness considering the width of the tail at the ends of which they are arranged.

Finally, flaps 32 for correcting the incidence are also provided and pivoted on the trailing edge of the empennage, on either side of the posts 33 and between the latter.

If the airplane is to be used for military purposes, the space reserved for the passengers is adapted to receive bombs and turrets for machine-guns. Two gunners' nacelles 34 can also be provided on the tail. It will be easily seen that a very large firing and visibility angle is available for gunners placed either at the front, or at the rear of the fuselage.

Considering the fuselage is divided into three distinct zones, it can conveniently be constructed in three parts adapted to be rapidly separated and connected up.

The first portion comprises the pilots' cockpit and the passengers' saloon and lavatories.

The second portion comprises the drums for the flexible surfaces and their mechanisms, the cellules and tanks.

The third portion comprises all the rear propelling unit.

It is thus easy to transport the airplane in a dismantled condition and to substitute for the front portion, another portion which transforms the airplane so that it can be used for military purposes. This front portion can moreover be connected to the central portion in such a manner that it may be rapidly released or dropped with a parachute which is normally folded in a housing of the central portion.

What I claim as my invention and desire to secure by Letters Patent is:

In a heavy transport airplane, a fuselage having an increased width in the horizontal section from the front portion to the rear thereof, variable lifting means positioned intermediate of the ends of the fuselage comprising fixed supports extending laterally from each side of the fuselage and movable flexible material carried by said supports to provide the wing structure, winding drums for moving the flexible material mounted within the fuselage adjacent the lateral extending supports, means for rotating the drums whereby the area of the lifting surfaces may be varied, the rear portion of the fuselage decreasing in vertical section towards the rear end to provide a wide compartment with relatively small height, a plurality of propelling motors arranged laterally of each other within said compartment, and the forward portion of the fuselage in front of the lifting means providing a load-carrying compartment.

JACQUES GERIN.